(12) United States Patent
Fleischman

(10) Patent No.: US 8,200,826 B1
(45) Date of Patent: Jun. 12, 2012

(54) COMMUNAL MEMORY

(75) Inventor: Robert M. Fleischman, Concord, NH (US)

(73) Assignee: Openwave Systems Inc., Redwood City, CA (US)

( * ) Notice: Subject to any disclaimer, the term of this patent is extended or adjusted under 35 U.S.C. 154(b) by 1854 days.

(21) Appl. No.: 10/938,158

(22) Filed: Sep. 9, 2004

(51) Int. Cl.
*G06F 15/16* (2006.01)
(52) U.S. Cl. .................. 709/227; 709/205; 709/225
(58) Field of Classification Search .............. None
See application file for complete search history.

(56) References Cited

U.S. PATENT DOCUMENTS

| | | | |
|---|---|---|---|
| 7,277,950 B1 * | 10/2007 | Chapweske | 709/227 |
| 2005/0050227 A1 * | 3/2005 | Michelman | 709/245 |
| 2005/0108368 A1 * | 5/2005 | Mohan et al. | 709/220 |

* cited by examiner

*Primary Examiner* — Patrice Winder

(57) ABSTRACT

According to an embodiment of the invention, a communal memory is disclosed. A communal memory is a shared memory between several participants over a network. The memory tracks the connectivity status of the participants. The state of each of the participants is shared with all of the other participants. Every participant tracks local connections, and compiles the connection data into an update. At a predetermined local interval, the update is transmitted to the other participants. This information can then be used to determine whether to accept network connections or for other purposes.

42 Claims, 7 Drawing Sheets

114

| LOCAL (116) | | | SHARED (118) | | |
|---|---|---|---|---|---|
| Simultaneous Connections | | 2.0.0.1 | Simultaneous Connections | | FROM: 2.0.0.2 |
| 1.0.0.1 | 3 | | 1.0.0.1 | 1 | |
| 1.0.0.2 | 1 | | 1.0.0.2 | 0 | |
| 1.0.0.5 | 5 | | 1.0.0.5 | 2 | |
| Data Sent | | | Data Sent | | |
| 1.0.0.1 | 54 MB | | 1.0.0.1 | 123 MB | |
| 1.0.0.2 | 12 MB | | 1.0.0.2 | 0 MB | |
| 1.0.0.5 | 34 MB | | 1.0.0.5 | 54 MB | |
| | | | LAST UPDATE: | 23-MAR-2004 12:13:30p | |
| | | | UPDATE INTERVAL: | 30 SECONDS | |
| | | | Simultaneous Connections | | FROM: 2.0.0.3 |
| | | | 1.0.0.1 | 0 | |
| | | | 1.0.0.2 | 0 | |
| | | | 1.0.0.5 | 1 | |
| | | | Data Sent | | |
| | | | 1.0.0.1 | 0 MB | |
| | | | 1.0.0.2 | 0 MB | |
| | | | 1.0.0.5 | 2 MB | |
| LAST UPDATE: | 23-MAR-2004 12:13:00p | | LAST UPDATE: | 23-MAR-2004 12:09:30p | |
| NEXT UPDATE | 23-MAR-2004 12:14:00p | | UPDATE INTERVAL | 5 MINUTES | |
| UPDATE INTERVAL: | 1 MINUTE | | | | |

| LOCAL | 2.0.0.1 | | SHARED | | FROM: 2.0.0.2 |
|---|---|---|---|---|---|
| Simultaneous Connections | | | Simultaneous Connections | | |
| 1.0.0.1 | 3 | | 1.0.0.1 | 1 | |
| 1.0.0.2 | 1 | | 1.0.0.2 | 0 | |
| 1.0.0.5 | 5 | | 1.0.0.5 | 2 | |
| Data Sent | | | Data Sent | | |
| 1.0.0.1 | 54 MB | | 1.0.0.1 | 123 MB | |
| 1.0.0.2 | 12 MB | | 1.0.0.2 | 0 MB | |
| 1.0.0.5 | 34 MB | | 1.0.0.5 | 54 MB | |
| LAST UPDATE: | 23-MAR-2004 12:13:00p | | LAST UPDATE: | 23-MAR-2004 12:13:30p | |
| NEXT UPDATE | 23-MAR-2004 12:14:00p | | UPDATE INTERVAL: | 30 SECONDS | |
| UPDATE INTERVAL: | 1 MINUTE | | | | |

302

| | | | FROM: 2.0.0.3 |
|---|---|---|---|
| Simultaneous Connections | | | |
| 1.0.0.1 | 0 | | |
| 1.0.0.2 | 0 | | |
| 1.0.0.5 | 1 | | |
| Data Sent | | | |
| 1.0.0.1 | 0 MB | | |
| 1.0.0.2 | 0 MB | | |
| 1.0.0.5 | 2 MB | | |
| LAST UPDATE: | 23-MAR-2004 12:09:30p | | |
| UPDATE INTERVAL: | 5 MINUTES | | |

304

116 — LOCAL
118 — SHARED

700

COMMUNAL MEMORY

FIELD OF THE INVENTION

The invention is generally related to shared memories and specifically to a loosely coupled memory shared between several remote participants.

BACKGROUND OF THE INVENTION

"Bulk e-mail" refers to large numbers of e-mail messages sent by a single sender to a large number of recipients. Bulk e-mail may either be e-mails that are requested by the recipient, such as a message from an e-commerce website including advertisements, or can be unsolicited bulk e-mail (UBE), more commonly known as "Spam." UBE and requested bulk e-mail can overwhelm a recipient e-mail system due to the resulting high volume of traffic. Additionally, UBE may include messages that contain computer viruses, scams, or other unwanted and undesirable content.

Several techniques may be implemented to reduce the amount of UBE received by an e-mail user. A recipient system may use a filtering program to remove e-mail messages that contain certain keywords. Alternatively, a recipient system may use rate limiting techniques. These techniques typically involve applying a limit to the amount of e-mail a specific sender may send per unit of time. The recipient system may use several different measures of e-mail traffic to limit volume from a sender. For example, a rate limiting system may specify that a specific sender may only send 500 messages per hour to the recipient. If the sender sends more than 500 messages in one hour, the excess messages will be rejected. Alternatively, a recipient may use connection limits that limit a number of connections made within a certain amount of time. These rate limiting techniques are effective in reducing excessive e-mail traffic from known and unknown abusive e-mail senders.

When only one e-mail server is receiving the incoming e-mail messages that are subject to rate limiting, the individual server can maintain a database of access information from a variety of different e-mail senders. When a sender tries to connect with the server, the server can reference the database to determine whether the proposed connection would exceed the rate limits. However, rate limiting may also be used over a large network including a number of participants. All of the participants on the network would then be subject to the same rate limit network-wide. For example, there may be a rate limit of 100 connections per hour from a specific sender. When the sender connects with any of the participants, those connections count toward the limit. If one sender initiated 50 connections with a first participant, and 50 connections with a second participant within one hour, the sender would then be unable to connect with any of the participants for the remainder of the hour.

When several remote participants are subject to the same rate limits, each individual participant must know the access data for all of the other participants when a sender attempts to make a connection. Each participant on the network must therefore update the other participants when an event that affects the rate limiting occurs, for example when a server accepts an e-mail connection, the server sends the details of the connection to all of the other participants. Sending and receiving updates about e-mail traffic and connection information over a large network can be resource intensive and may cause delays while waiting for updates from certain participants.

A distributed shared memory (DSM) is a memory that may be used by several participants over a network. The DSM allows any of the participants on the network to write to any part of the memory at any time. While a participant is writing to a portion of the DSM memory, that portion is "locked" and inaccessible to other users. The locking mechanism also requires that the participant writing to the memory must wait for the other participants to respond to the lock.

What is needed is a simple and efficient system for enabling rate limiting and other techniques by sharing information about connections over diverse networks.

SUMMARY OF THE INVENTION

According to an embodiment of the invention, data is shared amongst a plurality of remote participants. Information based on local connections is compiled in a first portion of a local memory. Other participants on a network are updated at a predetermined interval using the local information. Updates based on remote connections are received from the other participants at other intervals, and a second portion of the local memory is updated using the updates.

BRIEF DESCRIPTION OF THE DRAWINGS

One or more embodiments of the present invention are illustrated by way of example and not limitation in the figures of the accompanying drawings, in which like references indicate similar elements and in which:

FIG. 3 illustrates a communal memory and data recorded in the communal memory;

DETAILED DESCRIPTION OF THE INVENTION

Figure 1:
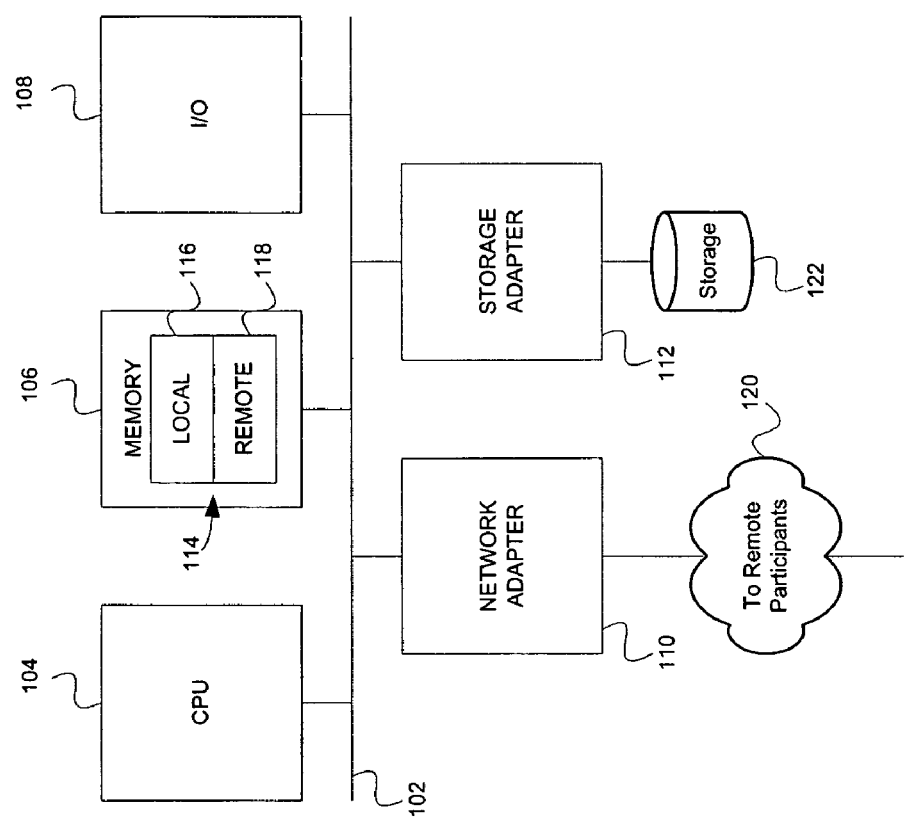
FIG. 1 illustrates a computer system on which embodiments of the invention may be practiced.

Described herein is a Communal Memory. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to one embodiment of the invention, a system for sharing state information about a network between several remote participants is disclosed. Participants are systems that participate in a network may be computer systems such as e-mail servers. The network includes several participants, and therefore several points of entry. Points of entry are access points onto the network. Therefore, each participant that is remotely accessible is a point of entry onto the network. Data about accesses to each of the points of entry are maintained and shared on the network. The system includes a "communal" memory, which comprises a memory on each of the several participants. The memory on each participant includes a portion for local data, and a portion for remote data. The portion for local data may include information about network connections made to that participant. The local information on the participant may then be shared with the other participants, so that the other participants know the information that the local participant knows. For example, if a local participant is tracking the number of network connections made by an e-mail sender, that information is transmitted to each of the other participants using the communal memory, so that each participant knows how many connections have been made system wide. The local participant updates the other participants at an interval chosen specifically for that local participant. For example, if the local participant has bandwidth restrictions or is distant to the other participants, the local participant may update at a slow rate. The other participants may choose other rates of which to update. This update selectivity provides for a loosely coupled shared memory, which allows the system to continue operating without waiting for updates from every participant.

The communal memory module may be used to implement e-mail rate limiting or connection limiting techniques. The communal memory module is a collective memory used by several participants. A participant is a system connected to a network that uses the data stored in the communal memory. For example, a participant may be an e-mail server that receives incoming connections. Each participant owns a unique portion of the communal memory on which the participant stores the data concerning connections made by email senders or other data that can be used to implement the communal memory. The participant can write to its portion of the shared memory, the remainder can only be read by the participant.

FIG. 1 illustrates a computer system on which embodiments of the invention may be practiced. The computer system 100 may be a participant in the loosely coupled network described herein. The computer system 100 includes a bus 102, which connects several elements of the computer system 100 together. Attached to the bus 102 are a central processing unit (CPU) 104, a memory 106, an input/output (I/O) adapter 108, a network adapter 110 and a storage adapter 112.

The CPU 104 may be a microprocessor such as those manufactured by Intel or Motorola. The system 100 may use an operating system such as any of the various Unix variants, Microsoft Windows, etc. The I/O adapter 108 is connected to and controls input and output devices such as displays, keyboards, mice, etc. The network adapter 110 is connected to a network 120 which connects the system 100 to the other participants on the network 120. The network 120 may be, for example, a wide area network (WAN) such as the Internet, or a local area network (LAN) such as a peer-to-peer network. The network configuration will be described further below. The storage adapter 112 is connected to a storage device 122. The storage device 122 may be, for example, optical or magnetic storage such as a hard drive or CD-ROM drive.

According to an embodiment of the invention, software may be used to implement the communal memory. The communal memory designates a shared portion 114 of the memory 106 to store the data implemented by the communal memory. The shared portion 114 is divided into local 116 and remote 118 portions. The local portion 116 stores the data collected by the system 100 regarding connections made to the system 100 over the network adapter 110. The remote portion 118 stores information about connections made by any of the other participants on the network. The other participants of the network transmit updates through the network adapter 110 to the system 100.

Figure 2:
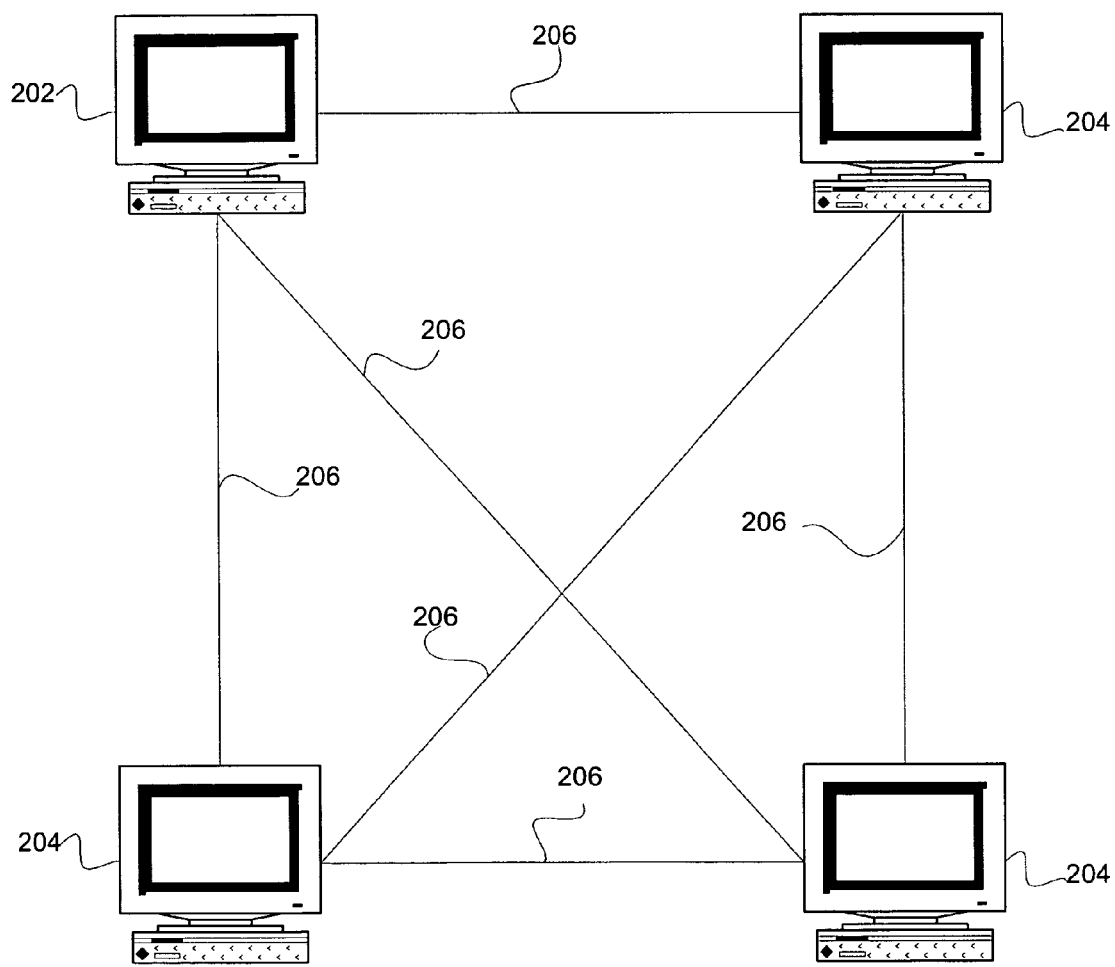
FIG. 2 illustrates a network over which a communal memory may be implemented according to one embodiment of the invention.

FIG. 2 illustrates a network 200 over which a communal memory may be implemented according to one embodiment of the invention. A "local participant" hereinafter designates the participant that is performing the action described. The "remote participants" are all of the other participants on the network. "Remote" and "local" are a matter of perspective. Any of the other participants can be considered the "local" participant while the other participants would be the "remote" participants. One participant is described as the local participant for discussion purposes.

A local participant 202 is connected to several remote participants 204 over several network connections 206. Since the portion of the communal memory transmitted in the updates is read-only, no acknowledgement is required when the update is made. As a result, each participant 202 or 204 requires one network connection with each other participant 202 or 204. The result is that only $$\frac{N^2 - N}{2}$$

network connections are required. For example, as shown in FIG. 2, the network 200 includes four participants 202 and 204, and there are six network connections 206. Twelve connections 206 would be required if an acknowledgement were needed from sender of the updates. Further, every time a local participant issued an update, the local participant would have to wait for an acknowledgement from each of the remote participants. If one participant were slow in responding, the local participant would not be able to act until the last participant acknowledged. Further description of embodiments of the invention will exemplify how the network 200 can operate without acknowledgements.

The network 200 may be a peer-to-peer network connecting each participant 202 or 204 directly to another part to the other participants. The peer-to-peer network 200 is configured so that each participant has an individual connection 206 with every other participant. In the peer-to-peer network 200 there is no centralized server to which each participant 202 or 204 communicates. Instead, each individual participant 202 or 204 may communicate directly with each other participant 202 or 204. These connections 206 may be made over another network, which may be a wide area network (WAN) such as the Internet. The connections may be made using standard protocols such as the Transmission Control Protocol/Internet Protocol (TCP/IP). The connections may also be local hardwired or wireless connections, which would comprise a local area network (LAN) using a router or hub to enable the individual connections 206. It is understood that although peer-to-peer network 200 is shown, other types of networks may be used to implement the communal memory such as a client-server topology.

As mentioned above, each participant 202 or 204 in the network 200 may issue updates at different intervals. For example, the local server 202 may be a high bandwidth participant that can issue frequent updates, and may issue these updates every 30 seconds. The local participant 202 may need to issue frequent updates since connection information relating to the local server 202 is changing so frequently. On the other hand, a remote participant 204 may be a distant, low bandwidth server. The remote participant 204 may then decide to update less frequently, for example every five minutes. Since no acknowledgements are required for the incoming updates from each of the participants, the communal memory itself can continue operating without waiting for slow participants to respond. For example, the fast server 202 may issue frequent updates to a slow participant, which would not be able to respond quickly. If the fast participant 202 had to wait for acknowledgements before proceeding, the fast participant 202 would often be waiting for slower, less reliable participants. Therefore, one feature of the present invention is that each participant may choose an update rate depending on its needs and abilities of the and the other participants can continue operating without those updates.

FIG. 3 illustrates a communal memory 114 and illustrate data recorded in the communal memory 114. The memory 114 may be part of the local participant 202. Each of the remote participants 204 will also have a similar communal memory. The communal memory 114 stores state information about connections made to all participants on the network 200. The individual participants can then use the information stored in the communal memory to make decisions about incoming connections.

As mentioned above, the communal memory 114 includes a local portion 116 and a shared portion 118. The local portion 116 can only be written by the local participant 202 to which it belongs. The local portion 116 tracks changes to the connectivity data made since the last update provided by the local participant. For example, if the communal memory were tracking total number of simultaneous connections within a set period of time, the local portion 116 shows that a sender at an address 1.0.0.1 has made three connections with the local participant 2.0.0.1. The communal memory is also tracking the total amount of data sent, and as can be seen, the local participant 2.0.0.1 has received 54 megabytes of data from the sender at the address 1.0.0.1. The local participant at 2.0.0.1 has last updated the other participants at 12:13 PM. The next update for the local participant at the address 2.0.0.1 is at 12:14 PM. So, the local participant at 2.0.0.1 updates the remote participants every minute. The data shown in the local portion 116 includes the changes to those data values since the last update. The data values therefore reset to zero at every update.

The remote portion 116 may be divided into several sub-portions, one for each remote participant. For example, the remote participant at the address 2.0.0.2 occupies the portion 302 of the memory 114. The participant at the address 2.0.0.3 occupies the portion 304 of the memory 114. As can be seen, the participant at the address 2.0.0.2 has last updated the local memory 114 at 12:13:30 PM, and updates every thirty seconds. The remote participant at the address 2.0.0.3 has last made an update over four minutes ago, and updates every five minutes.

The local participant 202 may decide not to use update data provided by another participant because the participant providing the update is unreliable or untrustworthy. The local participant 202 may also decide to ignore the data provided by the remote participants 204 based on the last update time. If, for example, the local participant 202 is determining whether to accept a connection based on the total number of simultaneous connections made by the sender, the data provided by the second remote participant at the address 2.0.0.3 may be too old to be useful. The local participant may then choose to disregard the data provided by the remote sender at the address 2.0.0.3. On the other hand, if the local sender is deciding whether to accept a connection based on the total number of messages sent by the sender in the last hour, the data provided by the remote sender at the address 2.0.0.3 is probably still useful. The local participant may choose which data to use based on the age of the update.

Figure 4:
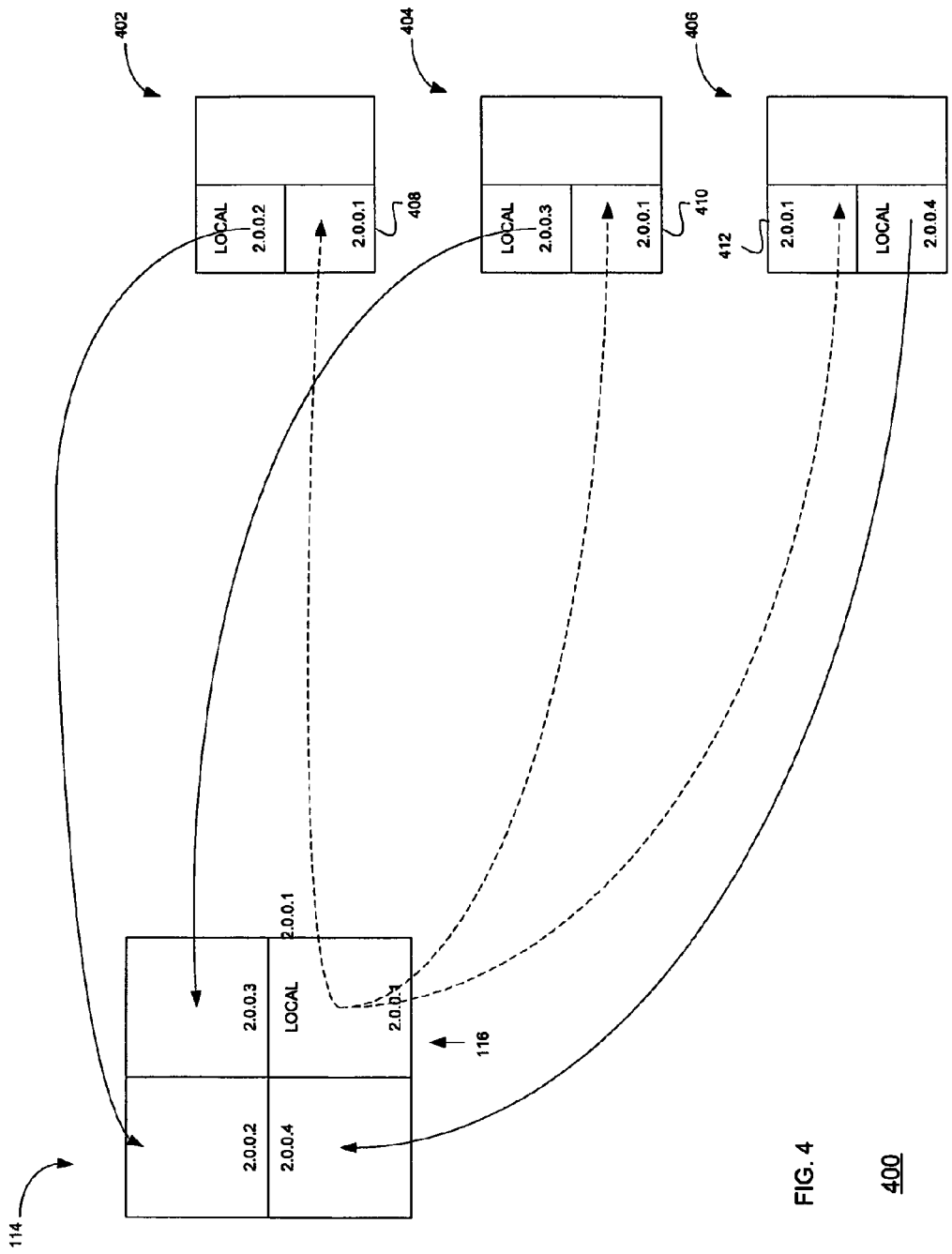
FIG. 4 illustrates the process of updating the remote participants.

FIG. 4 illustrates the process of updating the remote participants. According to one embodiment of the invention, each participant maintains updates in their portion of the communal memory. The updates indicate changes to previous reports made by the participant, and can be used to determine the state of the entire network. The updates may be applied to other participant's local memories. For example, each participant may have a local memory that includes one portion that contains the participants collected information, and separate portions for each other participant on the network.

Each participant receives updates from each other participant, which then applied to the respective portion of the local memory. This data can be used to determine whether to accept an incoming connection. For example, the collective network may utilize a rate-limiting algorithm where one email sender is only permitted to send a certain number of emails per unit of time. To implement this algorithm, each participant on the network collects data about every connection made to the participant. This data may include information about the sender, such as an Internet Protocol (IP) address, a mail from address, etc., and information about the connection. Depending on the type of rate limiting used, the participant may collect information about the total time of the connection, the total number of connections made, the total number of emails sent, etc. When a connection is accepted, the participants collects the data about the connection and adds the data to their portion of the communal memory in their local memory. At a pre-determined or dynamically set interval, which may be different for each participant on the network, each local participant updates the other participants with their portion of the communal memory. This way, a loosely coupled network is enabled, thereby not preventing participants from acting without waiting for slow or unresponsive participants to respond.

The local communal memory 114 includes the local portion of the communal memory 116. At the local update interval, which may be different from the remote update intervals, the local participant at the address 2.0.0.1 updates all of the other remote participants at the addresses 2.0.0.2, 2.0.0.3, and 2.0.0.4. The local participant may choose an update interval for example of one minute. Every one minute, the local participant will send the data collected in the local portion 116 of the local memory 114. The data in the local portion 302 is then copied over a network onto the remote participants 402, 404, and 406. Each of the remote participants 402, 404, and 406 has a corresponding portion of memory 408, 410, and 412 into which the update from the local participant is received.

Each of the remote participants 402, 404, and 406 also update the local participant at the intervals, which are specified for those remote participants. For example, the remote participant 402 may update the local participant every 30 seconds, while the remote participant 404 only updates the local participant every four minutes. These update intervals are determined on an individual participant basis, so that the individual participant is able to provide the updates in a timely manner without holding up the reset of the network.

According to one embodiment of the invention, a background thread may be used to track and maintain the updates. The thread may add to the update each time a connection is accepted.

Figure 5:
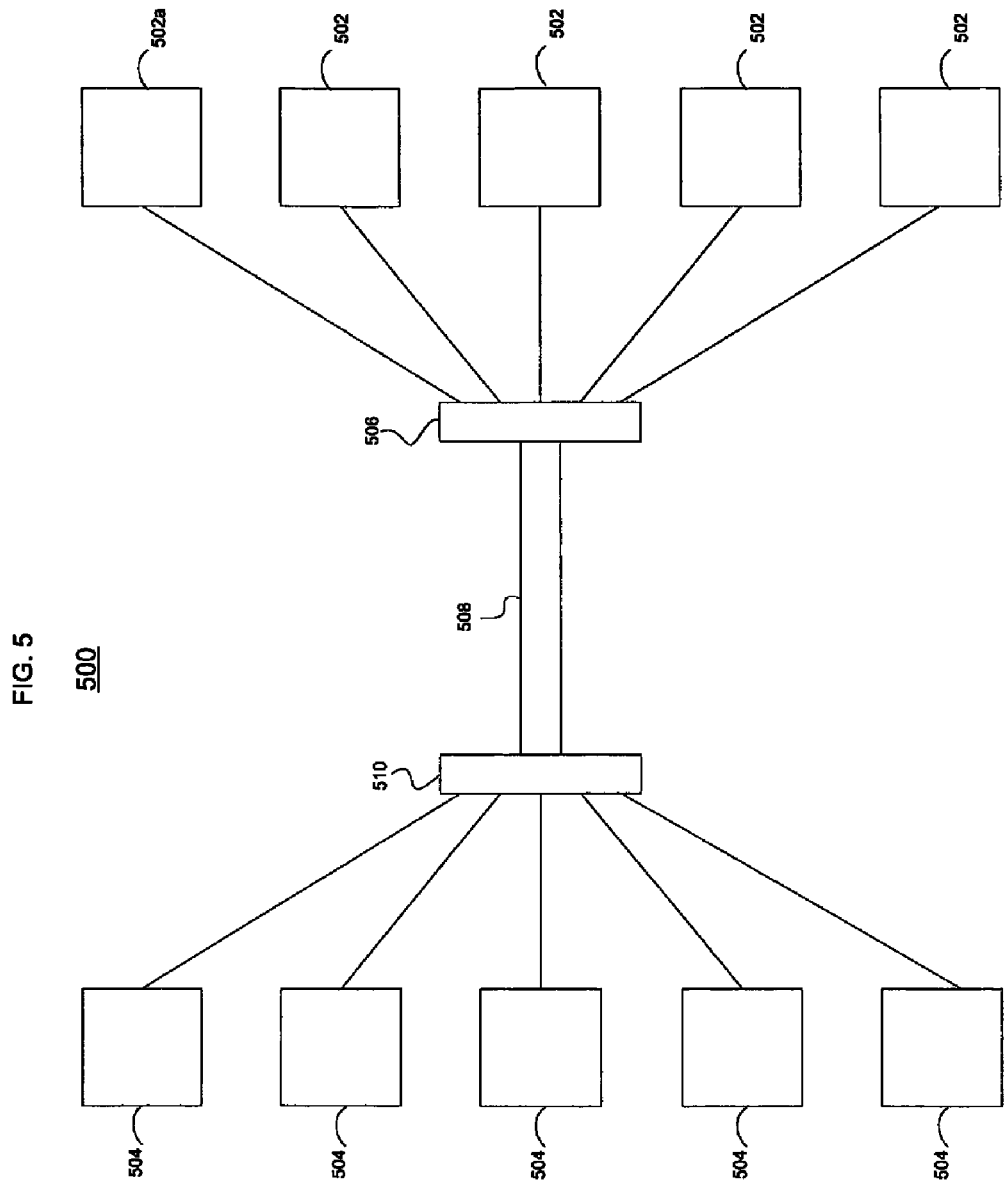
FIG. 5 illustrates using a router to improve transmission of updates.

FIG. 5 illustrates using a router to improve transmission of updates. Since the connections do not require acknowledgements, the updates sent by each of the participants are routable. Since each remote participant receives the same update from the local participant, the communal memory can save bandwidth by sending only one single update over long distances. For example, there may be five participants 502 in New York and five more participants 504 in California. When one of the New York participants 502a issues an update to the other participants, the New York participant 502a may issue five separate updates for the California participants 504. However, the New York participant 502a may also issue a single update to a router 506. The single update then transmitted over a network 508 to a California router 510. The California router 510 can then transmit the update to each of the California participants 504. Since each California participant 504 receives the same update, the update can be multiplexed together to save bandwidth.

Figure 6:
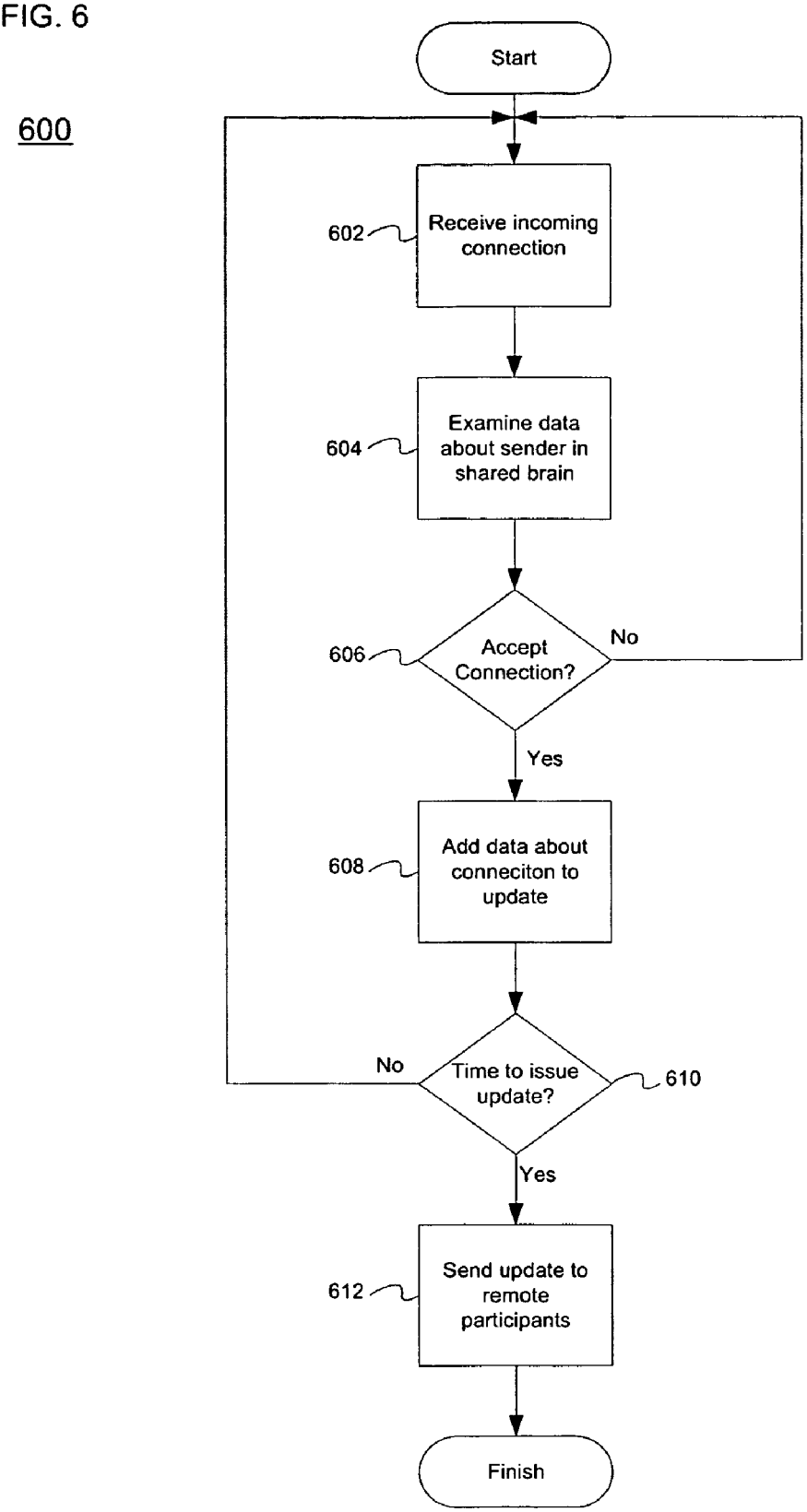
FIG. 6 is a flowchart describing a process for receiving incoming connections and updating local information.

FIG. 6 is a flowchart describing a process for receiving incoming connections and updating local information in a participant. In block 602, the local participant receives an incoming connection. The local participant may then, in block 604, examine at both the local and remote data about the sender in the communal memory to determine whether incoming connection should be accepted.

In block 606, it is determined whether the local participant will accept the incoming connection. The local participant determines whether to accept the incoming connection based on the data examined in block 604, and the connection, rate, or other limits previously established. For example, there may be a limit of 100 total connections for the whole day from the sender attempting to make the connection. If the local participant observes that the sender has already made 100 connections, and the incoming connection would exceed the limit, the local participant rejects the connection and the process 600 returns to block 602 where the next connection is received. If, however, the conditions for accepting a new connection are met, the process 600 continues to block 608.

In block 608, the incoming connection is accepted, and data about the connection is added to the local data portion of the communal memory. The data added in block 608 includes the identity of the sender, the number of connections made by the sender, the number of messages that are sent, the amount of data the sender has sent, etc. This data is added to the cumulative update that will be issued to the remote participants. The cumulative update lists all of the data for each sender that has made connection since the last update. In block 610 it is determined whether it is time to issue a new update. In block 610, the local participant examines the current clock time of the computer, compares it with the clock time of the last update and determines whether the appropriate amount of time has passed. For example, the local participant may have issued an update 30 seconds ago, with an interval of one minute. In this case the local participant would not issue a new update, and the process would return to block 602 where the next connection is received. If, however, the full minute interval has passed, the process 600 continues to block 612.

In block 612, the local sender sends the cumulative update to the remote participants. The update comprises the data, such as the data shown in FIG. 3, about the connections that the local participant has received since the local participant last issued an update. The update is transmitted over the network to all of the remote participants. The remote participants then receive the update and apply to the portion of the communal memory that is reserved for the local participant. After the remote participants have applied the new update, all of the participants on the network should have roughly the same data in the communal memory. Therefore, when accepting new connections, each participant can determine whether to accept incoming connections.

In some instances, the communal memory may contain somewhat inaccurate data. For example, a distant participant may accept two connections from a sender, bringing the total number of connections that can be made by that sender up to the limit of one hundred. If the distant participant has a slow update time, a second participant may accept more connections from the sender before the first participant issues the update indicating the first two connections. This condition would bring the total number of connections from the sender to 102, exceeding the limit. However, in practical usage, the limits are never exceeded by very much, since the updates will be relatively frequent. The advantage of a loosely coupled shared memory as described is that the participants can continue to operate without waiting for information from other participants.

Figure 7:
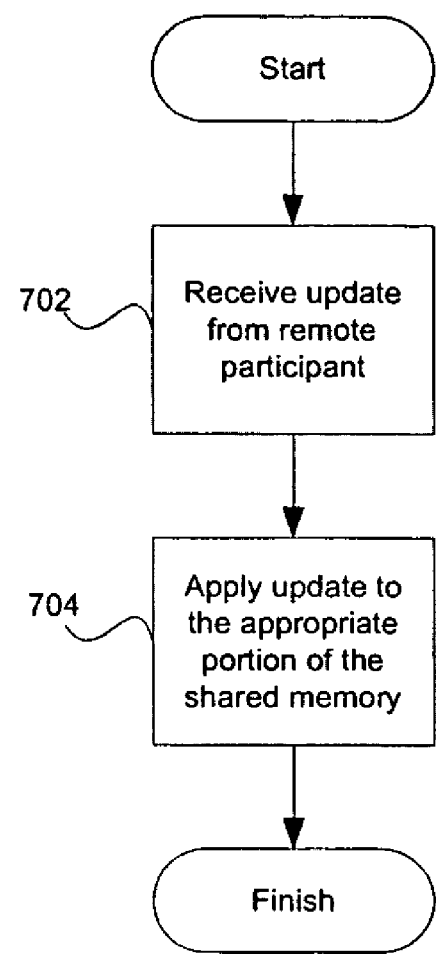
FIG. 7 is a flow chart describing a process for accepting and applying updates from remote participants.

FIG. 7 is a flow chart describing a process in a local participant for accepting and applying updates from remote participants. In block 702, the local participant receives an update from a remote participant. Each remote participant may have a different update interval, and as a result, the local participant may receive several different updates from different participants at varying intervals. Each update is received and applied separately. In block 704, the update is applied to the portion of the communal memory corresponding to the participant that sent the update. For example, a participant at an address 2.0.0.2 may have sent an update to the local participant. The local participant would then upon an update to the section of the communal memory belonging to that remote participant. In this way, each update at that the local participant receives keeps the local participant current about the state of the network.

This invention has been described with reference to specific exemplary embodiments thereof. It will, however, be evident to persons having the benefit of this disclosure that various modifications may be made to these embodiments without departing from the broader spirit and scope of the invention. Specification and drawings are accordingly, to be regarded in an illustrative rather than in a restrictive sense.

What is claimed is:

1. A method for determining whether to accept an incoming network connection in a network comprising a plurality of participants, the method comprising:

compiling a set of local information in a first portion of a local memory in a first participant, the first participant being referred to as the local participant, wherein the set of local information includes information about network connections made to the local participant;

updating other participants in the network using the set of local information, the other participants being referred to as remote participants and wherein the updating occurs at a first interval;

receiving updates at the local participant from the remote participants, wherein each of the updates includes information about network connections made to the respective remote participants and wherein the updates are received at intervals that are independent of the first interval;

using the received updates to update a set of remote information in a second portion of the local memory in the first participant, the set of remote information including the information about network connections made to the respective remote participants;

receiving a request for a new incoming network connection to the local participant; and determining whether to accept the new incoming network connection based on the set of local information at the local participant and based on the set of remote information at the local participant.

2. The method of claim 1, wherein updating a second portion of the local memory comprises applying the updates to subportions of the second portion corresponding to the other participants, wherein each subportion is specific to a particular remote participant.

3. The method of claim 1, wherein receiving updates comprises receiving the updates without returning an acknowledgement.

4. The method of claim 1, wherein determining whether to accept a new incoming network connection comprises:
examining the set of local information in the first portion of the local memory and the set of remote information in the second portion of the local memory;
comparing the set of local information in the first portion of the local memory and the set of remote information in the second portion of the local memory to a predetermined limit; and
accepting the new incoming network connection if accepting the new incoming network connection would not exceed the predetermined limit.

5. The method of claim 4, wherein examining the set of local information in the first portion of the local memory and the set of remote information in the second portion of the local memory comprises examining a time stamp of a first update to determine whether the first update is reliable.

6. The method of claim 1, wherein compiling a set of local information comprises:
maintaining a thread to compile the set of local information.

7. The method of claim 1, further comprising routing the updates through a router.

8. The method of claim 1, wherein the network connections are incoming e-mail connections.

9. The method of claim 1, wherein the network is a peer-to-peer network.

10. The method of claim 1, wherein the set of local information and the set of remote information are updated independently of each other in the local memory of the local participant.

11. The method of claim 1, wherein the set of local information stored at the local participant indicates a number of connections made to the local participant from a given data sending party, the set of remote information stored at the local participant indicates a number of connections made to the remote participants from the given data sending party, and the request for a new incoming network connection is received from the given data sending party.

12. The method of claim 1, wherein the set of local information stored at the local participant indicates an amount of data received at the local participant from a given data sending party, the set of remote information stored at the local participant indicates an amount of data received at the remote devices from the given sending party, and the request for a new incoming network connection is received from the given sending party.

13. A system for determining whether to accept a network connection in a network comprising a plurality of participants that form a network, the system comprising:
a first participant referred to as a local participant, the local participant comprising;
a network adapter to connect the local participant to other participants of the network, the other participants being referred to as remote participants; and
a memory including a first portion corresponding to the local participant and a second portion corresponding to the remote participants,
wherein the first portion of the memory stores a first set of information relating to network connections accepted by the local participant and the second portion of the memory stores a second set of information relating to network connections accepted by the remote participants,
the local participant being configured to:
update the remote participants using the first set of information at a first interval;
update the second set of information using remote updates received from the remote participants at other intervals;
receive a request for a new incoming network connection to the local participant; and
determine whether to accept the new incoming network connection based on the first set of information at the local participant and based on the second set of information at the local participant.

14. The system of claim 13, wherein the other intervals are independent of the first interval.

15. The system of claim 13, further comprising:
a processor coupled to the memory to implement a thread to generate the first set of information.

16. The system of claim 13, further comprising a processor coupled to the memory to determine whether to accept an incoming network connection based on the first set of information and the second set of information.

17. The system of claim 16, wherein the processor may disregard an individual remote update.

18. The system of claim 17, wherein the processor disregards the individual remote update because the individual remote update fails to meet a predetermined age criterion.

19. The system of claim 16 wherein the first set of information and the second set of information are updated independently of each other.

20. The system of claim 13, wherein the network connections are incoming e-mail connections.

21. The system of claim 13, wherein the local participant and the remote participants are connected using a peer-to-peer network.

22. The system of claim 13 wherein the first set of information and the second set of information are updated independently of each other.

23. The system of claim 13, wherein the set of local information stored at the local participant indicates a number of connections made to the local participant from a given data sending party, the set of remote information stored at the local participant indicates a number of connections made to the remote participants from the given data sending party, and the request for a new incoming network connection is received from the given data sending party.

24. The system of claim 13, wherein the set of local information stored at the local participant indicates an amount of data received at the local participant from a given data sending party, the set of remote information stored at the local participant indicates an amount of data received at the remote devices from the given sending party, and the request for a new incoming network connection is received from the given sending party.

25. A method for determining whether to accept an incoming connection in a network comprising a plurality of participants, the method comprising:
storing a set of local information relating to a local participant in a first portion of a local memory, wherein the local information includes information about network connections made to the local participant;

storing a set of remote information relating to remote participants in a second portion of the local memory, wherein the remote information includes information about network connections made to the remote participants;

sending updates of the set of local information to the remote participants at a predetermined interval;

receiving updates of the set of remote information from the remote participants at other intervals;

receiving a request for a new incoming network connection to the local participant; and determining whether to accept the new incoming network connection based on the set of local information at the local participant and based on the set of remote information at the local participant.

26. The method of claim 25, wherein receiving updates of the set of remote information comprises receiving updates of the set of remote information from the remote participants at other intervals independent of the predetermined interval.

27. The method of claim 25, further comprising: ignoring a portion of the set of remote information provided by an unreliable participant.

28. The method of claim 27, wherein ignoring a portion of the set of remote information comprises:
ignoring the portion of the set of remote information if the portion fails to meet a predetermined age criterion.

29. The method of claim 27, wherein ignoring a portion of the set of remote information comprises:
ignoring the portion of the set of remote information if the unreliable participant is untrustworthy.

30. The method of claim 25, wherein the network connections are incoming e-mail messages.

31. The method of claim 25, further comprising:
connecting the local participant and the remote participants using a peer to-peer network.

32. The method of claim 25 further comprising updating the stored set of local information and updating the stored set of remote information independently of each other.

33. The method of claim 25, wherein the set of local information stored at the local participant indicates a number of connections made to the local participant from a given data sending party, the set of remote information stored at the local participant indicates a number of connections made to the remote participants from the given data sending party, and the request for a new incoming network connection is received from the given data sending party.

34. The method of claim 25, wherein the set of local information stored at the local participant indicates an amount of data received at the local participant from a given data sending party, the set of remote information stored at the local participant indicates an amount of data received at the remote devices from the given sending party, and the request for a new incoming network connection is received from the given sending party.

35. A device for use as a participant in a network comprising a plurality of other, remote, participants, the device comprising:
a first memory to store a first set of information regarding network connections made to the participant; and
a second memory coupled to the first memory to store a second set of information regarding network connections made to the remote participants;
a network adapter coupled to the first and second memories, the network adapter to receive incoming updates to update the second set of information and to transmit outgoing updates reflecting changes to the first set of information;
a processor coupled to the first and second memories, wherein, responsive to receipt of a request for a new network connection to the device, the processor determines whether to accept the new incoming network connection at the device based on the first set of information stored in the first memory and the second set of information stored in the second set of memory.

36. The device of claim 35, wherein the processor operates a thread to generate the outgoing updates.

37. The device of claim 35, wherein the outgoing updates are issued at a predetermined local interval and wherein the incoming updates are issued at other intervals independent of the predetermined local interval.

38. The device of claim 35, wherein the network connections comprise incoming e-mail connections.

39. The participant of claim 35, wherein the device and the remote participants are connected over a peer-to-peer network.

40. The device of claim 35, wherein the processor is configured to update the stored first set of information and to update the stored second set of information independently of each other.

41. The device of claim 35, wherein the first set of information stored at the local participant indicates a number of connections made to the local participant from a given data sending party, the second set of information stored at the local participant indicates a number of connections made to the remote participants from the given data sending party, and the request for a new incoming network connection is received from the given data sending party.

42. The device of claim 35, wherein the first set of information stored at the local participant indicates an amount of data received at the local participant from a given data sending party, the second set of information stored at the local participant indicates an amount of data received at the remote devices from the given sending party, and the request for a new incoming network connection is received from the given sending party.

* * * * *